(12) United States Patent
Bastianelli

(10) Patent No.: US 9,661,483 B2
(45) Date of Patent: May 23, 2017

(54) MULTI-FUNCTION EMERGENCY ASSISTANCE REQUEST, TRACKING, AND COMMUNICATION SYSTEM

(71) Applicant: Piero Maria Bastianelli, Ancona (IT)

(72) Inventor: Piero Maria Bastianelli, Ancona (IT)

(73) Assignee: Enrico Bastianelli, Monte San Vito (AN) (IT)

( * ) Notice: Subject to any disclaimer, the term of this patent is extended or adjusted under 35 U.S.C. 154(b) by 0 days.

(21) Appl. No.: 14/744,250

(22) Filed: Jun. 19, 2015

(65) Prior Publication Data

US 2015/0373519 A1     Dec. 24, 2015

Related U.S. Application Data

(60) Provisional application No. 62/014,980, filed on Jun. 20, 2014, provisional application No. 62/016,735, filed on Jun. 25, 2014.

(51) Int. Cl.
*H04M 11/04* (2006.01)
*H04W 4/22* (2009.01)
*H04W 4/02* (2009.01)
*H04W 84/18* (2009.01)

(52) U.S. Cl.
CPC ............... *H04W 4/22* (2013.01); *H04W 4/02* (2013.01); *H04W 84/18* (2013.01)

(58) Field of Classification Search
USPC .................................................. 455/404.1
See application file for complete search history.

(56) References Cited

U.S. PATENT DOCUMENTS

| | | | |
|---|---|---|---|
| 2005/0159170 A1* | 7/2005 | Puranik | G08G 1/20 455/456.1 |
| 2008/0091350 A1* | 4/2008 | Smith | G01C 21/165 701/472 |
| 2011/0252131 A1* | 10/2011 | Karaoguz | H04L 41/12 709/224 |
| 2012/0113575 A1* | 5/2012 | Uy | G01S 5/0231 361/679.01 |
| 2012/0309422 A1* | 12/2012 | Lewis-Evans | B60R 25/1025 455/456.1 |
| 2013/0063304 A1* | 3/2013 | O'Regan | G01S 5/0027 342/357.55 |

* cited by examiner

*Primary Examiner* — Joel Ajayi
(74) *Attorney, Agent, or Firm* — Adrian D. Battison; Ade & Comany Inc.

(57) ABSTRACT

A multi-function emergency assistance request, tracking, and communication system is defined by a Hub and Spoke concept of portable units able to communicate one to each other using satellite with global earth coverage by sending GPS coordinates and text, by which the user can create its own private network inside the satellite network. A central Server manages the private network to decide which Spoke(s) are referred to specific hub(s). Functionalities include tracking without internet access (only through satellite link), system for rapid evacuation where the spoke(s) call in the Hub and receives back the confirmation of message received and read from the hub and Command and Control center from the server where the user can track all private networks and can communicate with each device through text.

18 Claims, 1 Drawing Sheet

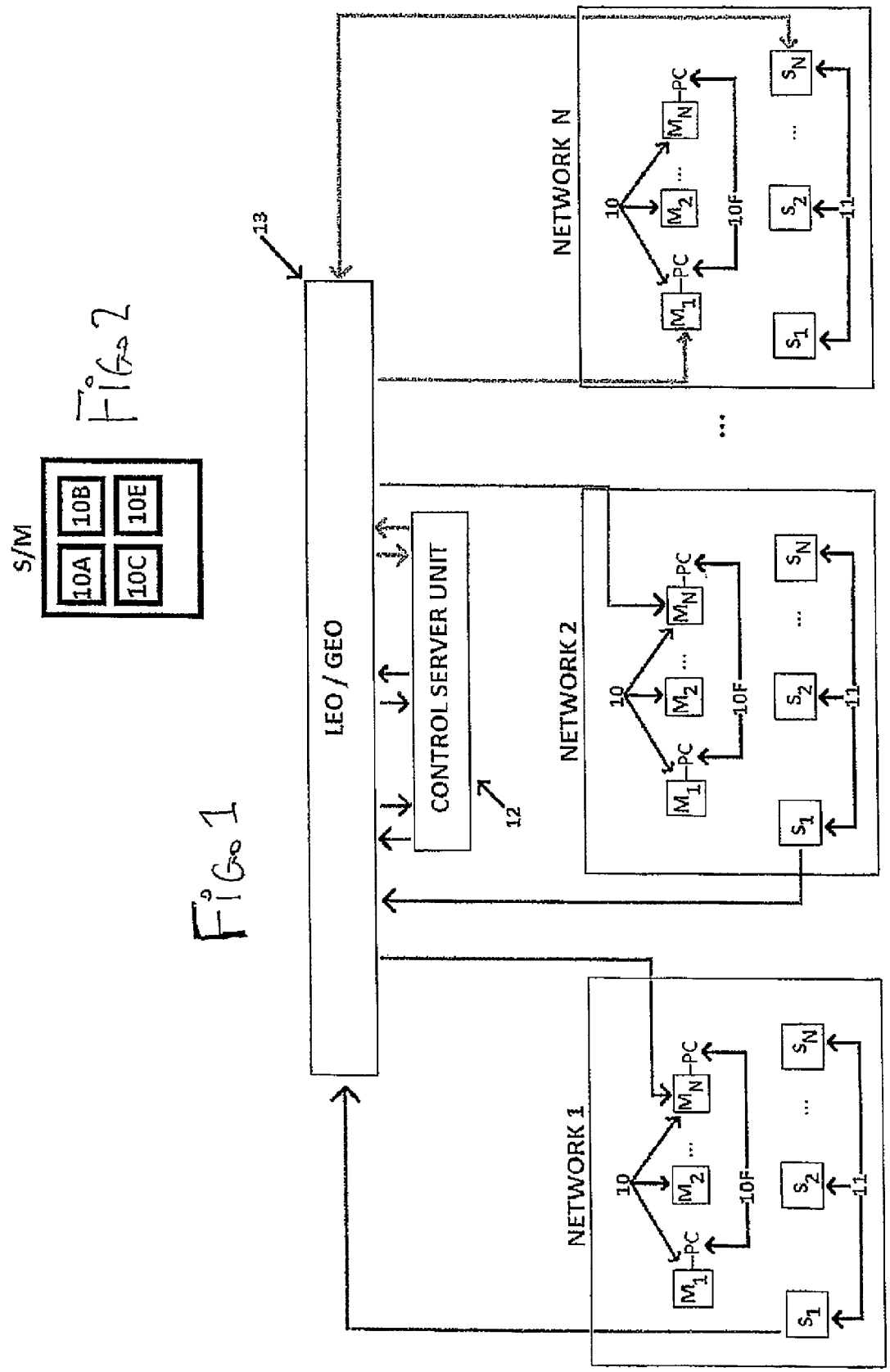

MULTI-FUNCTION EMERGENCY ASSISTANCE REQUEST, TRACKING, AND COMMUNICATION SYSTEM

This application claims the benefit under 35 USC 119 (e) of Provisional Application 62/014,980 filed Jun. 20, 2014 and of Provisional Application 62/016,735 filed Jun. 25, 2014.

This invention relates to a multi-function emergency assistance request, tracking, and communication system.

SUMMARY OF THE INVENTION

According to the invention there is provided a multi-function emergency assistance request, tracking, and communication system comprising:

a plurality of HUB units arranged to be deployed to personnel;

plurality of SPOKE units arranged to be deployed to personnel;

each of the HUB and SPOKE units comprising portable, hand-held units equipped with satellite position network receivers and Low Earth Orbit (LEO) and/or Geosynchronous (GEO) satellite communication transceivers;

each of the HUB and SPOKE units being programmable to carry out a plurality of separate functions of the system;

a control server system that controls communication between the HUB and SPOKE units, or alternatively, between a network comprised exclusively of HUB units, or multiple HUBs and SPOKEs on the same network.

The arrangement provided herein includes as a key concept a Hub and Spoke arrangement, through which the user can create its own private network inside the satellite network. The private network is provided by one or more Hub and an associated number of Spoke units all of which are able to communicate with one to each other by sending GPS coordinates and text.

There is a central Server from where the user can create and manage the private network, so the user of the network can decide which Spoke units are referred to the specific hub unit or units.

The units are portable, without installation required, and communicate using satellite with global earth coverage.

From that the user can have the following functionalities:

Tracking of the SPOKE units without internet access only through the satellite link, A system for rapid evacuation where the spoke units call in the Hub unit and automatically receive back the confirmation of message received and read from the hub unit (so the user of the spoke unit is sure that someone is coming), The Command and Control centre of the server can provide to the user tracking of all private network which can communicate with each unit through text.

Furthermore the user have a system which is GPS jamming insensitive so that the user can have access to each functionality in the event of jamming using intentional electromagnetic noise.

Yet further the user can have a system in order to transmit from under the sea level where the satellite system normally cannot transmit.

The invention defines communication links and mechanisms with multiple units in the field ("SPOKE" units) with one or more "HUB" units and the associated Control Server. All units, HUB and SPOKE, consist of portable, hand-held units equipped with satellite position network receivers and Low Earth Orbit (LEO) and/or Geosynchronous (GEO) satellite communication transceivers, forming a completely mobile end-to-end network. The HUB and SPOKE units may differ by case colour, so they can easily be identified when deploying.

The units each have the programming built-in to be configured for each of three modes. This gives the units in the field the flexibility to change function when they need to comply with new operational objectives and tactics.

Command codes are transmitted to the units by the Control Server over the LEO and/or GEO satellite communication link to set the units to any of the three modes of operation. The three modes of operation are as follows:

Functionality 1: which provides an automated assistance request and response system.

Functionality 2: which provides a method of exchanging short messages between all units and displaying positions on a portable map program by using a HUB unit as a "portable satellite ground station" in a remote location such as a command tent or vehicle as an aggregator of position data for all units.

Functionality 3: where SPOKE and HUB units are configured for rapid deployment into hostile environments with an optical transmission system and an internal dead reckoning module to provide position and transmission in the instance where GPS and GEO/LEO signals are jammed, and an interface to common military GPS units with both L1 and L2 frequency reception, which provides a method of functionality 1, functionality 2 and exchanging short messages between all units and the Control Server, where the Control Server is in a stationary location such as a headquarters complex.

The SPOKE and HUB units each use GPS for obtaining a position for communication as explained hereinafter. However when GPS is not available, the system can be operated using an internal "dead reckoning" module to give it position when the GPS is jammed by interference.

The system consists of the following parts:

a) Multiple SPOKE units, deployed to personnel on foot, or any type of land, sea or air vehicle, who may need assistance at some time.

b) One or more HUB units, deployed to personnel that are equipped to respond to requests for support and/or evacuation from personnel equipped with SPOKE units.

c) A Control Server system that conducts the following functions:

i) Definition of which specific HUB units are to be linked with specific SPOKE units, and/or other HUB units, to create a unique network of many defined SPOKEs to one or more defined HUBs. Typically, the SPOKEs and HUBs are identified by a serial number. The configuration of unique network is not static, but it is flexible. In a very simple a quick way (about 10 seconds) the Control Server's user can change network to each specific device.

ii) Controlling which mode all the SPOKE and HUB units are in, by sending configuration commands through the LEO and/or GEO satellite system to each unit and receiving a confirmation that each unit has been successfully configured.

iii) Reception of all SPOKE messages, and routing these messages to specific HUB unit(s) in FUNCTIONALITY 1 and FUNCTIONALITY 2 modes, according to the SPOKE message packet data.

iv) Reception of all HUB messages, and routing these messages to the specific SPOKE or HUB unit(s) in FUNCTIONALITY 1 and FUNCTIONALITY 2 modes, according to the definition of the HUB message packet data.

v) Recording of all transmissions into a database.
vi) Receive and send txt messages from and to each Hub and Spoke unit in the field

BRIEF DESCRIPTION OF THE DRAWINGS

One embodiment of the invention will now be described in conjunction with the accompanying drawings in which:

FIG. 1 is a schematic illustration of the components of the system according to the present invention.

FIG. 2 is a schematic illustration of one of the HUB or SPOKE units of the system of FIG. 1.

In the drawings like characters of reference indicate corresponding parts in the different figures.

DETAILED DESCRIPTION

The system herein shown in FIG. 1 provides a multi-function emergency assistance request, tracking, and communication system. The system includes a plurality of HUB units 10 and SPOKE units 11 each arranged to be deployed to personnel to be carried by that person. Each of the HUB and SPOKE units shown in FIG. 2 comprises portable, hand-held unit equipped with satellite position network receivers 10A and Low Earth Orbit (LEO) and/or Geosynchronous (GEO) satellite communication transceivers 10B and each being programmable on an internal control unit 10C to carry out a plurality of separate functions of the system. The system further includes a control server system 12 that controls communication between the HUB and SPOKE units through the LEO and/or GEO system 13.

The HUB and SPOKE units are programmable to determine which specific HUB units are to be linked with specific SPOKE and/or HUB units so as to create a unique network of many defined SPOKE units S1, S2 to one or more defined HUB units M1, M2, where the SPOKE and HUB units are identified by a serial number so that they can be associated in the programming and addressing. The HUB and SPOKE units may differ by case colour, so they can easily be identified when deploying.

The HUB and SPOKE units are programmable by sending configuration commands through the LEO and/or GEO satellite system from the control server system to each unit and receiving a confirmation that each unit has been successfully configured.

The HUB and SPOKE units are programmable to be configured for each of three modes where the first mode comprises FUNCTIONALITY 1 which provides an automated assistance request and response system, the second mode comprises FUNCTIONALITY 2 which provides a method of exchanging short messages between all units and displaying positions on a portable map program by using a HUB as an aggregator of position data for all SPOKE units associated therewith and the third mode comprises FUNCTIONALITY 3 which provides a method of exchanging short messages between all units and the Control Server, where the Control Server is in a stationary location such as a headquarters complex and SPOKE HUB units are configured for use in hostile GPS jamming environments by implementing a dead reckoning module and may interface to military GPS units employing both L1 and L2 frequencies. Furthermore the SPOKE and HUB units are equipped with an optical data transmission that allows data to be sent even if the GEO or LEO signal is disturbed by jamming.

Each of the HUB and SPOKE units includes pre-coded keys 10E. Each HUB unit consists of one handheld HUB unit connected to a portable Personal Computer 10F running map software. The Personal Computer is only necessary in order to display the position received from the HUB unit, coming from specific SPOKE and HUB units linked to it through Central Server. The choice of what specific mapping software and what specific portable Personal Computer is open, since the intelligence is all inside the HUB unit, that is able to recognize/detect the mapping software and the PC used and transmit to the portable PC over a USB connection the appropriate correct data string that can be displayed on the screen. In that way the PC and the mapping software are not part of the device but are only channels for display of positions on the map, since the on-board HUB intelligence allows complete independence on the choice of the specific PC and software cartographic used.

The units, both HUB and SPOKE, have particular software that continuously checks the strength of LEO/GEO satellite signal. If the software detects no LEO/GEO signal for more than 30 seconds, the units as soon as the satellite signal will increase will automatically connect to the satellite in order to check if there are incoming messages arrived during the absence of satellite signal. In the case there are messages the unit will automatically download them.

Functionality 1

The tight integration of the SPOKE units to the HUB units in FUNCTIONALITY 1 mode is provided by the use of specific built-in commands and responses to provide rapid requests to HUB units and automatic message confirmations sent back to SPOKE units. A unit feature of the FUNCTIONALITY 1 mode network is that it operates over LEO and/or GEO satellite links, which enables the use of units with small omnidirectional antennas in all areas of the world. This innovative closed-loop communications system is ideal for rapidly calling support or evacuation personnel operating HUB units.

The core functionality of the FUNCTIONALITY 1 mode is to operate as a simple, rapid, closed-loop assistance request mechanism that can be deployed anywhere due to the use of LEO and/or GEO satellite links. The steps in operation are as follows:

1. One of many SPOKE units within a defined group of SPOKE units will initiate a request for assistance to a specific HUB inside the same network. The request message is initiated when the user pushes pre-coded keys on a SPOKE unit keypad. The request message includes the serial number of the SPOKE making the request, the destination of the packet for a specific HUB unit, and the geographic location of the SPOKE and the date and time. A copy of the message is saved in the SPOKE unit memory.

2. The assistance message is transmitted over a LEO and/or GEO satellite network and is received by the Control Server.

3. The Control Server decodes the packet, saves it in a database, creates a new message packet containing the data destined for the specific HUB unit, and stores a copy of the message in a database. This message contains the identification of the SPOKE making the request and the location of the SPOKE and the date and time.

4. The Control Server sends the new message packet to that particular HUB through a LEO and/or GEO satellite network.

5. The HUB receives the message from the Control Server. This message is decoded in the HUB, and an audible and visual alarm is triggered in the HUB unit.

6. The location of the requesting SPOKE and the date and time of the instant the message was sent are displayed on the HUB unit screen. The message received by the HUB is stored in the memory of the HUB unit.

7. The SPOKE location is noted by the personnel operating the HUB by reading the SPOKE location from the HUB screen. A key is pressed on the HUB to clear the screen and automatically send an acknowledgement of message reception to the SPOKE.

8. A confirmation message is automatically created in the HUB and saved to the HUB unit memory. The confirmation message consists of the identifier for the SPOKE, the current date and time and the code indicated "message received".

9. The confirmation message is automatically transmitted by the HUB unit to the Control Server through the LEO and/or GEO satellite network.

10. The Control Server receives the confirmation message from the HUB, stores it in the database, and creates a new message for the specific SPOKE that made the request. The acknowledgement message to the SPOKE consists of the identifier for the HUB, the date and time of the instant message was sent and the code for "message acknowledged". A copy of the message is saved in a database.

11. The Control Server transmits the acknowledgement message to the specific SPOKE unit through the LEO and/or GEO satellite network.

12. The SPOKE unit which made the original request receives the acknowledgement message. An audible and visual alarm is triggered in the SPOKE unit to indicate message reception and a message indicating the specific HUB has received the request and is acting on the request is displayed on the SPOKE unit screen.

13. If the SPOKE which initiated the original assistance message does not receive a "message acknowledged" message from the specific HUB within a set time-out period, the SPOKE automatically re-sends a new assistance message to re-start the process from 2.

14. In military applications, SPOKE and HUB units include an emergency switch that will send a coded distress message indicating imminent capture. Once this distress message is sent, the units operate code that deactivates the unit firmware. This means that a captor will not be able to use the units.

15. Unit uses algorithms for ensuring complete contact:
time since last time a communication satellite heard to trigger an immediate connect when a satellite is heard after an defined interval;
checking for queued messages and continuing to connect if any are left;
plus a timed interval where it will connect to check for messages in case an incoming message alert is not heard.

16. As an option, the SPOKE and HUB units may also direct text messages created manually by operators to specific SPOKE and HUB units, to groups of SPOKE and HUB units, or to all SPOKE and/or all HUB units. Text messages can be created with a unit keypad, or by an external unit connected by a wired or wireless serial communication connection to a HUB or SPOKE unit. The closed-loop architecture allows an assistance request to be sent to the specific HUB unit supposed to be in the same geographical area and so that the required assistance can be immediately started. Furthermore a pre-code key allows an assistance message to be sent in a very quick and simple way. These two factors save time and minimize the assistance time in a situation where each second can determine the life or death of personnel.

Functionality 2

As in FUNCTIONALITY 1 mode, SPOKE and the HUB unit(s) are all mobile, are tightly integrated as a network group by the Control Server and communicate over LEO and/or GEO satellite links with pre-defined commands.

However, FUNCTIONALITY 2 mode is for communications and tracking, rather than serving primarily as a means of summoning assistance directly to HUB units, as in FUNCTIONALITY 1 mode.

The firmware in the HUB enabled by switching to FUNCTIONALITY 2 mode is able to decode position reports from SPOKE units and outputting them through a serial communications link to a PC running map software. The HUB consists of one handheld HUB unit connected to a portable computer running map software. This means it can operate in any location or type of vehicle where there is sufficient room, even while the vehicle is moving.

The Personal Computer is only necessary in order to display the position received from the HUB unit, coming from specific SPOKE and HUB units linked to it through Central Server. The choice of what specific mapping software and what specific portable Personal Computer is open, since the intelligence is all inside the HUB unit, that is able to recognize/detect the mapping software and the PC used and transmit to the portable PC over a USB connection the appropriate correct data string that can be displayed on the screen. In that way the PC and the mapping software are not part of the device but are only channels for display of positions on the map, since the on-board HUB intelligence allows complete independence on the choice of the specific PC and software cartographic used.

The firmware in the SPOKE units allows the SPOKEs to be configured to send a position at a pre-defined interval ("CT", or Continuous Tracking mode), or alternately, only when requested to do so by a HUB unit ("OR", or On Request).

The core functionality of the FUNCTIONALITY 2 mode is to operate as a simple, light, mobile, closed-loop tracking and text message system that can be deployed anywhere due to the use of LEO and/or GEO satellite links. The steps in operation for FUNCTIONALITY 2 in CT mode are as follows:

1. One of many SPOKE units within a defined group of SPOKE units in CT mode will send a position report message. The position report is either due to a timed interval trigger internal to the SPOKE.

2. The position report message includes the serial number of the SPOKE making the request, telemetry regarding the SPOKE unit such as temperature, battery information and whether or not it has been in one position for a long period of time, plus the geographic location of the SPOKE.

3. The position report message is transmitted over a LEO and/or GEO satellite network and is received by the Control Server.

4. The Control Server decodes the packet, saves it in a database, creates a new message packet containing the position report destined for the specific HUB unit, and stores a copy of the message in a database. This message contains the identification of the SPOKE making the request and the location of the SPOKE. Note that the control server may optionally package a number of SPOKE reports received within a specified time period into one transmission to reduce bandwidth use.

5. The Control Server sends the new message packet to the particular HUB unit(s) inside the same network of the SPOKE unit which sent the message through a LEO and/or GEO satellite network.

6. The HUB(s) receive the message from the Control Server. This message is decoded in the HUB, and transmitted to the Personal Computer by a serial data link.

7. The location of the requesting SPOKE is displayed on the PC map program map screen. The location of the SPOKE is stored in memory on the PC.

8. When the HUB unit receives the position report message from the Control Server, the HUB sends a position report message back to the Control Server. The position report message includes the serial number of the HUB making the request, telemetry regarding the HUB unit such as temperature, battery information and whether or not it has been in one position for a long period of time, plus the geographic location of the HUB.

9. The HUB's position report message is transmitted by the HUB unit to the Control Server through the LEO and/or GEO satellite network.

10. The Control Server receives the position report message from the HUB, stores it in the database.

The FUNCTIONALITY 2 mode also includes an alternative OR mode, as explained before, where the steps in operation for FUNCTIONALITY 2 in the OR mode are as follows:

1. The SPOKEs in OR mode do not transmit their position automatically. Instead, they only transmit position when a request for transmission is made from a HUB or the Control Server.

2. If the HUB unit initiates a Transmit Request message: The operator running the HUB unit presses a key combination on the front keypad of the HUB unit to request a location packet from either a single SPOKE, group of SPOKEs or all SPOKEs in the same group as the HUB unit. The Transmit Request message can also be initiated from the portable computer connected to the HUB unit through specific software to be installed on the PC.

3. The Transmit Request message includes the serial number of the HUB making the request, the pre-formatted code for the SPOKE, group of SPOKEs or all SPOKEs to transmit, plus the geographic location of the HUB.

4. The Transmit Request message is transmitted over a LEO and/or GEO satellite network and is received by the Control Server.

5. The Control Server decodes the packet, saves it in a database, creates a new Transmit Request message or messages destined for the specific SPOKE unit(s), and stores a copy of each message in a database. This message contains the code for Transmit Request.

6. The Control Server sends the new message packet to the particular SPOKE unit(s) through a LEO and/or GEO satellite network.

7. The SPOKE(s) receiving the Transmit Request message(s) receive the message and decodes the command packet.

8. Each respective SPOKE automatically creates a Position Report and transmits the Position Report over the LEO and/or GEO satellite network.

9. Each SPOKE Position Report is received by the Control Server. The Control Server stored a copy of the received transmission in a database, and creates a new message with the Position Report to be transmitted to the respective HUB unit(s). Note that the control server may optionally package a number of SPOKE reports received within a specified time period into one transmission to reduce bandwidth use.

10. The Control Server sends the new message packet to the particular HUB unit(s) through a LEO and/or GEO satellite network.

11. The HUB(s) receive the message from the Control Server. This message is decoded in the HUB, and transmitted to the Personal Computer by a serial data link.

12. The location of the requesting SPOKE is displayed on the PC map program map screen. The location of the SPOKE is stored in memory on the PC.

13. When the HUB unit receives the position report message from the Control Server, the HUB sends a position report message back to the Control Server. The position report message includes the serial number of the HUB making the request, telemetry regarding the HUB unit such as temperature, battery information and whether or not it has been in one position for a long period of time, plus the geographic location of the HUB.

14. The HUB's position report message is transmitted by the HUB unit to the Control Server through the LEO and/or GEO satellite network.

15. The Control Server receives the position report message from the HUB, stores it in the database.

16. Note that as an option, SPOKEs and HUB units may also direct text messages created manually by operators to specific SPOKE and HUB units, to groups of SPOKE and HUB units, or to all SPOKEs and/or all HUBs. Text messages can be created with a unit keypad, or by an external unit connected by a wired or wireless serial communication connection to a HUB or SPOKE unit.

The FUNCTIONALITY 2 mode provides a tracking system for specific SPOKE units from everywhere thanks to the global coverage available from GEO and LEO satellite network, without the need of terrestrial structures and high band data transmission capabilities, and usable on board of any air land and marine vehicle. The tracking system can be set in few minutes and the HUB units can operates in the same geographical area of the SPOKE units able to manage the mission from near ready to intervene in case of need.

Functionality 3

In this mode, all SPOKEs and HUB unit(s) are commanded by the Control Server over the air to send their positions to the Control Server. SPOKE and HUB unit(s) can send messages to each other as well as to the Control Server. Note that in this mode, there is no difference in operation between HUB and SPOKE units that are employed in this mode. This is simply a third mode that the units are capable of operating in that enables both the HUBs and SPOKEs to be rapidly deployed to work directly with a central headquarters, rather than a central headquarters and field-deployed portable computers with map displays communicating through a connected HUB unit. The steps of operation in FUNCTIONALITY 3 mode are as follows:

1. All units within a defined group of SPOKE and HUB units send a position report message at timed intervals or on request from the Control Server, or text message as referenced in the FUNCTIONALITY 2 section.

2. The position report message includes the serial number of the SPOKE or HUB, whether or not it has been in one position for a long period of time, plus the geographic location of the SPOKE. If it is a text message, all of this information may be included in addition to the text message body.

3. The position report or text message is transmitted over a LEO and/or GEO satellite network and is received by the Control Server.

4. The Control Server decodes the packet and saves it in a database

5. Operators at the Control Server or connected directly to the Control Server from remote locations over a data link can send messages and configuration commands to the respective mobile units.

The units can be operated to use a "dead reckoning" module to give it position when the GPS is jammed by interference and/or connected to a military GPS with both L1 and L2 frequencies for high precision. Moreover the units both HUB and SPOKE are equipped by an optical laser transmission system. In general the optical transmission is point-to-point, and requires that sender and receiving units are pointed one against the other in such a way that the laser light in output from the sender unit hits precisely the receiver of the receiving. However the optical transmission system used on HUB and SPOKE units solves the pointing problem, since it has a particular small and portable optic that allows to direct the light from every direction to the receiver of the receiving.

These additional features allows to works also in the FUNCTIONALITY 1 and FUNCTIONALITY 2 also when the GPS and GEO/LEO satellite signals are purposely disturbed by jamming. The Jamming is a real and big problem, on a side because the enemy uses a jamming in order to disturb the communication, on the other side the soldiers themselves uses the jamming to turn off the possibility that the enemies can trigger bombs using remote trigger mechanism, like cellular phones.

The FUNCTIONALITY 3 offers also in case of jamming, an automated assistance request and response system provided by FUNCTIONALITY 1, and the possibility to displaying positions on a portable map program given by FUNCTIONALITY 2.

Furthermore the units, both HUB and SPOKE, in FUNCTIONALITY 3 mode can be hidden placed and under the sea level, for example on a bottom of a vessel, able to transmit from there. Is common knowledge that both GEO/LEO and GPS signals is blocked by a few centimeters of water, and also the optical transmission is unusable from under the sea level. The antenna of the units in fact is equipped by a programmable mechanism able to put the antenna above the sea level when is time to transmit, and allows to have GEO/LEO satellite signal in order to send GPS coordinates, acquired from GPS signal or in case of jamming calculated by internal "dead reckoning" module. The units are able to control the mechanism and restore the antenna under the sea level as soon as the transmission is made, in order to keep everything invisible.

This feature is useful in such application when is necessary to have the position of a vessel, without the crew on board knows anything.

In FUNCTIONALITY 2 there is a check for the connection between HUB unit and PC. The HUB sends its position trough USB to the PC every 20 seconds. If 3 consecutives position not arrived to PC, the PC give an alert. This is important because the user knows if the HUB is properly connected to the PC.

In FUNCTIONALITY 2: there is a mechanical lock between HUB and PC. This ensures that the cable cannot be accidentally disconnected.

All data sent by each HUB and SPOKE remains stored in the Control Server, this is important to remark because, if the HUB breaks itself, or the battery dies, or something causes the malfunctioning of the HUB in each case the units became unusable, there is NO LOSS OF DATA. The data remains stored in the Server.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A communication system for operation within an environment of a satellite communication network comprising:
    a plurality of HUB units arranged to be deployed to personnel;
    a plurality of SPOKE units arranged to be deployed to personnel;
    each of the HUB and SPOKE units comprising a portable, hand-held unit equipped with satellite position network receivers and Low Earth Orbit (LEO) and/or Geosynchronous (GEO) satellite communication transceivers so as to be configured for communicating using the satellite communication network;
    a control server system that controls communication between the HUB and SPOKE units;
    wherein a group of the SPOKE units is programmable to be linked to one or more HUB units to form a private network for communication within the satellite communication network that is separate from other ones of the SPOKE units and HUB units which are excluded from said private network;
    wherein one mode of operation provides an automated assistance request and response system where each one of the group of the SPOKE units is programmable to initiate a request for assistance to that HUB unit on said private network;
    wherein, when a distress message is sent from a respective one of the group of the SPOKE units, said SPOKE unit is configured to operate programming that deactivates the unit;
    wherein one mode of operation provides a method of exchanging short messages between all units and displaying positions on a portable map program by using one of the HUB units on the private network as an aggregator of position data for the group of the SPOKE units linked therewith on said private network; and
    wherein the HUB and SPOKE units are programmable so that only HUB units may be deployed on a separate network such that the position of all HUB units are transmitted to all other HUB units.

2. A communication system according to claim 1 wherein the SPOKE and HUB units are identified by a serial number.

3. A communication system according to claim 1 wherein the HUB and SPOKE units are programmable by sending configuration commands through the LEO and/or GEO satellite system to each unit and receiving a confirmation that each unit has been successfully configured.

4. A communication system according to claim 1 wherein the request is initiated when a user of a respective on of the group of the SPOKE units pushes pre-coded keys thereon.

5. A communication system according to claim 1 wherein said one of the HUB units is connected to a portable computer running map software.

6. A communication system according to claim 1 wherein one mode of operation provides a method of exchanging short messages between all units and the control server system, where the control server system is in a stationary location such as a headquarters complex.

7. A communication system according to claim 1 wherein tight integration of the group of the SPOKE units to said one or more HUB unit on the private network is obtained by the use of specific built-in commands and responses to provide rapid requests to said one or more HUB units and automatic message confirmations sent back to the group of the SPOKE units.

8. A communication system according to claim 7 wherein an acknowledgement message to a respective one of the group of the SPOKE units comprises an identifier for said one or more of the HUB units and the code for "message acknowledged".

9. A communication system according to claim 7 wherein the control server system transmits an acknowledgement message to one of the croup of the SPOKE units through the communication network.

10. A communication system according to claim 1 wherein the control server system uses algorithms for ensuring complete contact wherein:
time since last time a communication satellite was heard is arranged to trigger an immediate connect when a satellite is heard after an defined interval;
checking for queued messages and continuing to connect if any are left;
a timed interval where it will connect to check for messages in case a ring alert is not heard.

11. A communication system according to claim 1 wherein the HUB and SPOKE units are equipped with a "dead reckoning" internal module, able to calculate the GPS coordinates when there is jamming of the GPS system.

12. A communication system according to claim 1 wherein the HUB and SPOKE units are equipped with an optical transmission system able to transmit also if the units are not pointed one against the other, in order to transmit data when the LEO/GEO satellite signals are disturbed by jamming.

13. A communication system according to claim 1 wherein the HUB and SPOKE units are equipped with a programmable mechanism able to put an antenna thereof above sea level, in the event that the unit is at a bottom of a vessel, in order to transmit the GPS coordinates and to restore the antenna below the sea level once the transmission is made.

14. A communication system according to claim 1 wherein the control server system is configured to be an intermediate in the communication from a sender unit defined by one of the SPOKE units or one of the HUB units on the private network to a receiver unit defined by the other one thereof on the private network such that the control server system receives data being communicated by the sender unit destined for the receiver unit.

15. A communication system according to claim 14 wherein the control server system is configured to forward the data to the receiver unit after the data is received from the sender unit so as to facilitate a whole of the communication between the sender unit and the receiver unit.

16. A communication system according to claim 14 wherein the control system is configured to process the data received so as to determine a respective one of the SPOKE and the HUB units defining the receiver unit of the communication, before the data is forwarded to said receiver unit.

17. A communication system according to claim 14 wherein the control server system is configured to save the data so as to maintain a record of the data in the event that one of the sender unit and the receiver unit is lost or captured by an entity other than the personnel.

18. A communication system according to claim 1 wherein the control server system is configured for communicating using the satellite communication network.

* * * * *